J. H. SMITH,

Assignor of one-third interest to E. C. STEARNS.

Hollow-Auger.

No. 9,131. Reissued Mar. 30, 1880.

WITNESSES:

E. Laass

C. Bendixen

INVENTOR:

J. Heston Smith per Dodge, Laass & Hay

Attorneys

N. PETERS, PHOTO-LITHOGRAPHER, WASHINGTON, D. C.

UNITED STATES PATENT OFFICE.

J. HESTON SMITH, OF THREE TONS, PENNSYLVANIA, ASSIGNOR OF ONE-THIRD INTEREST TO EDWARD C. STEARNS.

HOLLOW AUGER.

SPECIFICATION forming part of Reissued Letters Patent No. 9,131, dated March 30, 1880.

Original No. 56,459, dated July 17, 1866. Application for reissue filed December 31, 1879.

DIVISION B.

*To all whom it may concern:*

Be it known that I, J. HESTON SMITH, of Three Tons, Montgomery county, in the State of Pennsylvania, have invented certain new and useful Improvements in Hollow Augers for Cutting Tenons upon Wagon-Spokes and Similar Articles; and I declare the following to be such a full, clear, and exact description of the same as to enable any person skilled in the art to which it appertains to make and use the same.

This invention relates to a simple, convenient, and effective device for securing a knife or cutter to the cutter-head of a hollow auger, so as to permit of its ready attachment and detachment for repairs or renewal, and of its ready adjustment to produce the desired cut.

The invention consists, essentially, in providing the cutter-carrying jaw of the auger with a groove or recess forming shoulders against opposite sides of the cutter, which is seated in said groove or recess and partly projects above the face of the jaw, so as to receive all the pressure of a strap or cap applied across the shank of the cutter, and clamped by bolts at opposite sides of same, all as hereinafter more fully described.

Figure 2:
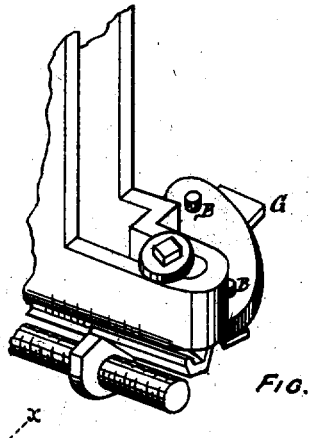
Figure 1:
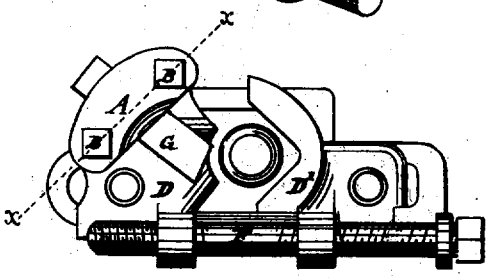

In the accompanying drawings, Figure 1 is a plan view of a cutter-head with the cutter secured thereto by my improved device; Fig. 2, a perspective inverted view of that part of the cutter-head to which my improvements pertain; and Fig. 3, a transverse section on line *x x* in Fig. 2, showing more fully the devices for holding the cutter in its operative position.

Similar letters of reference indicate corresponding parts.

Figure 3:
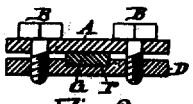

D represents one of the jaws of a hollow auger. This jaw is provided in its face with a groove or recess, *r*, of proper width and depth to receive the cutter or knife G and effectually sustain it against lateral play and allow it to partly project above the face of the jaw, as best seen in Fig. 3 of the drawings.

The cutter is retained in the recess and prevented from longitudinal movement by the pressure and friction of the plain-faced strap or cap A, applied across the shank of the cutter, and clamped thereon by bolts B B, passing through the cap A at opposite sides of the cutter and entering screw-holes in the jaw D.

By tightening the bolts B B the pressure of the cap A is brought directly upon the cutter, and, in conjunction with the shoulders of the recess *r*, bearing against the sides of the cutter, serves to effectually sustain the same in its operative position, and enable it to resist the strain incident to its encounter with hard and tough timber without the aid of extra set-screws, as heretofore employed.

The adjustment of the cutter, as well as its attachment and detachment for repairs or renewal, is readily accomplished by simply loosening the bolts B B, which releases the cutter from the pressure of the cap A and allows the said cutter to be moved longitudinally.

The cutter-carrying jaw D and gage-jaw D′ are adjusted to cut a tenon of the required diameter by means of a right-and-left screw, F, engaging nuts on the respective jaws.

I am aware that knives or cutters of boring-tools have been secured in their operative position on the stock of the tool by the aid of set-screws bearing against the rear end of the cutter; but such an arrangement is not adapted for the class of hollow augers to which my improvements pertain. By my invention the cutter is sustained laterally by rigid shoulders on the cutter-head abutting against the sides of the cutter, and the longitudinal displacement of the cutter is prevented by the frictional hold of the strap or cap clamped across the cutter, in the manner hereinbefore described.

Having thus described my invention, what I claim is—

1. In combination with the jaw D′, the jaw D, provided with the recess *r*, the cutter G, fitted between the sides of said recess and projecting above the face of the jaw, and the plain-faced cap A, applied across the cutter and clamped by bolts B B, passing through the cap at opposite sides of the cutter and entering threaded holes in the jaw, all constructed, combined, and operating substantially in the manner described and shown.

2. A hollow auger having its jaws adjusted by a right-and-left screw, and the cutter secured in a recess in one of said jaws by a strap applied across the cutter and clamped by bolts at opposite sides of same.

In testimony that I claim the foregoing I have hereunto set my hand this 4th day of October, A. D. 1879, in presence of two attesting witnesses.

J. HESTON SMITH.

Witnesses:
JAMES H. WOLFE,
FRANK KANE.